No. 627,691.                                                        Patented June 27, 1899.
J. C. HIGGINS.
SOFT TREAD HORSESHOE.
(Application filed May 2, 1898.)

(No Model.)

Witnesses:
Raphaël Netter
Benjamin Miller

Joseph C. Higgins,
Inventor
by Drury W. Cooper Atty.

UNITED STATES PATENT OFFICE.

JOSEPH C. HIGGINS, OF BOUND BROOK, NEW JERSEY, ASSIGNOR OF ONE-THIRD TO GEORGE VAN NEST BALDWIN, JR., OF NEW BRUNSWICK, NEW JERSEY.

SOFT-TREAD HORSESHOE.

SPECIFICATION forming part of Letters Patent No. 627,691, dated June 27, 1899.

Application filed May 2, 1898. Serial No. 679,457. (No model.)

*To all whom it may concern:*

Be it known that I, JOSEPH C. HIGGINS, a citizen of the United States, residing at Bound Brook, Somerset county, State of New Jersey, have invented certain new and useful Improvements in Soft-Tread Horseshoes, of which the following is a full, clear, and exact description, reference being had to the accompanying drawings, in which corresponding parts are indicated by like letters of reference.

The object of my invention is the construction of a non-slipping horseshoe in which the soft-tread cushion, which adheres to the smooth or slippery roadway and thereby gives the animal wearing it a firm foothold, is so connected to the lower side of a horseshoe of ordinary make that it may be detached therefrom and replaced without removing the shoe from the horse's foot. This object I attain by the use of an auxiliary horseshoe or keeper so arranged with reference to the main shoe when in position upon it as to hold the cushion firmly in position, but so attached as to be readily removed without detachment of the main horseshoe.

Figure 1:
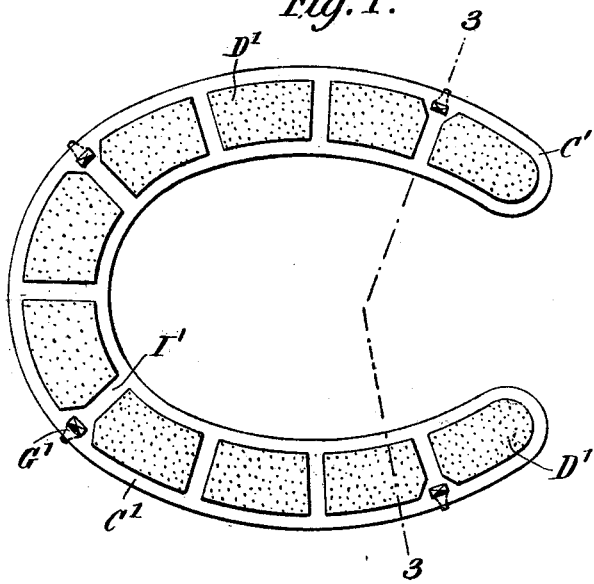
Figure 2:
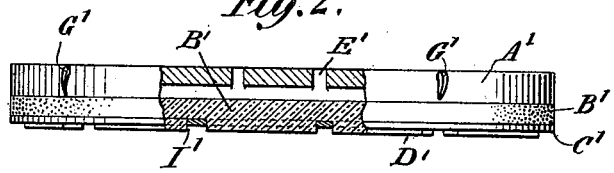
Figure 3:
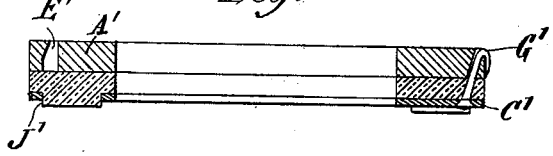
Figure 4:
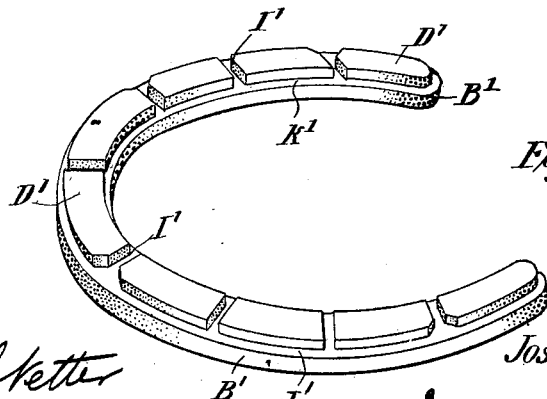

In the drawings, Figure 1 is a plan view of the under face of a horseshoe made according to my invention. Fig. 2 is a side view of the same, partly in section. Fig. 3 is a cross-sectional view taken on the line 3 3 of Fig. 1. Fig. 4 is a perspective view of the cushion detached.

A' represents a horseshoe of any ordinary form, except that it is smooth—that is, unprovided with calks—and adapted to be secured to the hoof by nails passing through the holes E'. The cushion B' is shown as following the contour of the horseshoe. The under or tread side of the cushion B' is provided with a number of projections, as D' D', so arranged as to leave flat strips or edges, as J' K', running on the outside and inside of the projections D', and a number of indentations I' I' between the projections D' and connecting the strips or edges J' K'. The lower cushion-securing member C', which is preferably formed of metal, is shaped to fit over the projections on B'—that is to say, it conforms in outline to the flat or depressed surface of the cushion B', as is shown in Fig. 1. At suitable points provision is made for the insertion of nails G' to hold the lower member C' and the cushion B' to the upper member A'. These nails preferably run diagonally outward to the outside rim of the upper member A', just below the hoof side of the shoe, as shown in Figs. 2 and 3.

It is obvious that the mode of attaching the auxiliary shoe or keeper C' to the main horseshoe can be varied widely without departing from the spirit of my invention.

What I claim as my invention is—

1. In a horseshoe, the combination with an upper member adapted to be secured to the hoof, of a soft-tread cushion of substantially the contour of the said upper member, and having upon its lower surface a plurality of projections which are bounded on either side by strips J' K', a lower securing member or keeper adapted to fit between the said projections of the cushion, and covering the strips J' and K' thereof, whereby the cushion is confined on either side of the projections thereof, and means for securing the lower member to the upper member, substantially as set forth.

2. In a horseshoe, the combination with an upper member adapted to be secured to the hoof, of a soft-tread cushion of substantially the contour of the said upper member, and having upon its lower surface a plurality of projections, and a strip J' on the outside of such projections, a lower member or keeper adapted to fit over the said projections of the cushion and to confine the strip J' thereof between itself and the upper member, and nails extending diagonally through the said lower member, the cushion, and the upper member, and emerging at the outer rim of the latter, substantially as set forth.

JOSEPH C. HIGGINS.

Witnesses:
DRURY W. COOPER,
M. LAWSON DYER.